United States Patent [19]
Fisher

[11] Patent Number: 5,903,267
[45] Date of Patent: May 11, 1999

[54] DOCUMENT INTERFACE MECHANISM AND METHOD FOR NAVIGATING THROUGH LARGE DOCUMENTS

[75] Inventor: Mark E. Fisher, Rochester, Minn.

[73] Assignee: International Business Machines Corporation, Armonk, N.Y.

[21] Appl. No.: 08/893,469

[22] Filed: Jul. 11, 1997

[51] Int. Cl.[6] ...................................................... G06F 3/14
[52] U.S. Cl. ......................... 345/341; 345/123; 345/340; 345/357; 345/157
[58] Field of Search ..................................... 345/123, 145, 345/157, 340, 341, 357; 707/513, 514

[56] References Cited

U.S. PATENT DOCUMENTS

| | | | |
|---|---|---|---|
| 5,196,838 | 3/1993 | Meier et al. | 340/724 |
| 5,313,229 | 5/1994 | Gilligan et al. | 345/157 |
| 5,371,846 | 12/1994 | Bates | 395/157 |
| 5,374,942 | 12/1994 | Gilligan et al. | 345/157 |
| 5,473,344 | 12/1995 | Bacon et al. | 345/163 |
| 5,506,951 | 4/1996 | Ishikawa | 345/341 |
| 5,526,480 | 6/1996 | Gibson | 395/154 |
| 5,528,260 | 6/1996 | Kent | 345/123 |
| 5,530,455 | 6/1996 | Gillick et al. | 345/163 |
| 5,550,969 | 8/1996 | Torres | 345/123 |
| 5,633,657 | 5/1997 | Falcon | 345/145 |

OTHER PUBLICATIONS

IBM Technical Disclosure Bulletin, vol. 37, No. 08, Aug. 1994, "New Common User AccessCon Pushpad for Greater Mouse Productivity," pp. 497–499.

IBM Technical Disclosure Bulletin, vol. 38, No. 01, Jan. 1995, "Speed–Sensitive Scroll Widgets," pp. 483–484.

IBM Patent Application, "A Graphical User Interface Method and System That Provides An Inertial Within a Scroll Bar" filed Feb. 21, 1997, and issued serial No. 08/804,460 (IBM Docket R0997).

IBM Patent Application, "Scroll Bar Amplification Apparatus and Method" filed Mar. 19, 1997, and issued serial No. 08/820,798 (IBM Docket R0997–007).

Delrina 7.0 WinFax Pro Getting Started Guide, Getting Started Basics, Apr. 1996, pp. 5–11.

Microsoft, Getting Results with MicroSoft Office 97, Microsoft Corporation, 1996.

Automated Patent System (APS) Workstation, Quick Reference Guide for Third Generation WorkStation (3GWS), Mar. 27, 1996, pp. i–iv, 1–1 to 2–7. US Department of Commerce, USPTO.

*Primary Examiner*—Raymond J. Bayerl
*Assistant Examiner*—Thomas T. Nguyen
*Attorney, Agent, or Firm*—Schmeiser, Olsen & Watts

[57] ABSTRACT

The preferred embodiment of the present invention provides a method and apparatus for controlling the scroll rate of a scroll bar slider in a graphical user interface. The preferred embodiment uses a domain mechanism that divides large documents into multiple domains. The document is displayed in a viewing window with the slider moving the document from one of the current domain to the other end. Because the slider only moves within one domain, and not the whole document, the slider sensitivity is reduced such that it can be effectively used to scroll through documents. The document can be moved within the viewing window to other domains by activating one of a plurality of domain marks, where each domain mark represents a domain not currently scrollable with the slider. Thus, the entire document can be easily browsed while the scroll rate is maintained at an effective level. This provides a user with a high degree of control when viewing all sizes of documents.

25 Claims, 9 Drawing Sheets

DOCUMENT INTERFACE MECHANISM AND METHOD FOR NAVIGATING THROUGH LARGE DOCUMENTS

BACKGROUND OF THE INVENTION

1. Technical Field

The present invention relates in general to user interfaces for computers. More specifically, the present invention relates to scroll bars in graphical user interfaces.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Early computer systems required an extensive knowledge of commands for a user to perform any type of function. These computer employed what is known as a command line in which a specific command would have to be entered to perform just about any type of operation. This limited the use of computers to those who had the time to learn a large number of relatively cryptic commands.

Later computer systems used a more advanced user interface to make it easier for a computer user to perform functions without knowledge of specific commands. The most common modern interface is the graphical user interface, or GUI. A GUI uses some type of symbol, menu or other mechanism which is activated by a computer user with a pointing device (e.g., a mouse, a trackball) to perform many commonly performed tasks. These graphical mechanisms are usually designed to be somewhat consistent and self-explanatory to make it as easy as possible for a user to perform common functions.

Most graphical interfaces display documents in a portion of the screen called a window. Where the document is large, only a partial view of the document is visible in the window at a time. To view other portions of a document a graphical device called a scroll bar is used. Scroll bars allow a user to move down or across a document using a pointing device. In particular, the scroll bar allows a user to move to other document portions by either clicking and dragging the slider in the scroll bar or by clicking somewhere on the scroll bar.

Turning to FIG. 8, an exemplary graphical user interface 700 is illustrated. The graphical interface 700 is like many of the current applications and operating systems available that use graphical elements to facilitate commonly used operations. The graphical interface 700, in this case for a word processing program, uses a scroll bar 702 with a slider 704 to facilitate a user moving to view different document portions. With the slider 704 at the top of the scroll bar area 706, the user interface displays the top portion of the document. When the slider 704 is moved to the bottom of the scroll bar area 706, the user interface displays the bottom portion of the document. In the illustrated example, a user can move down in the document by clicking and dragging the slider 704 with a pointing device. Alternatively, the user can move down in the document by clicking on the exposed scroll bar area 706 under the slider 704, or by clicking on the down arrow 708.

Turning to FIG. 9, the graphical user interface 700 is shown displaying a larger document with the slider 704 correspondingly smaller and the exposed scroll bar area 706 correspondingly larger.

Slider sensitivity is a function of the document size and the available scroll bar area. The larger the document, the larger the amount of document movement results from a given amount of slider movement. Thus, with a large document, moving the slider even a small amount results in large amounts of movement in the document. This high sensitivity to slider movement makes it very difficult to scroll by clicking and dragging the slider without "jumps" in the view of the document. Because the desired location in the document may be skipped during a jump, these jumps make it very difficult to controllably scroll the document. Thus, with prior art systems it can be very difficult to effectively scroll though large documents.

Without an improved mechanism for controlling a slider in a scroll bar, the efficient and effective work on large documents will continue to be hampered by the limits of the present day graphical user interface.

SUMMARY OF THE INVENTION

The preferred embodiment of the present invention provides a method and apparatus for controlling the scroll rate of a scroll bar slider in a graphical user interface. The preferred embodiment uses a domain mechanism that divides large documents into multiple domains. The document is displayed in a viewing window with the slider moving the document from one end of the current domain to the other end. Because the slider only moves within one domain, and not the whole document, the slider sensitivity is reduced such that it can be effectively used to scroll through documents. The document can be moved within the viewing window to other domains by activating one of a plurality of domain marks, where each domain mark represents a domain not currently scrollable with the slider.

Thus, the preferred embodiments have the advantage of providing navigation through a large document while maintaining the scroll rate at an effective level. This provides a user with a high degree of control when viewing all sizes of documents.

DESCRIPTION OF THE PREFERRED EMBODIMENTS

Figure 1:
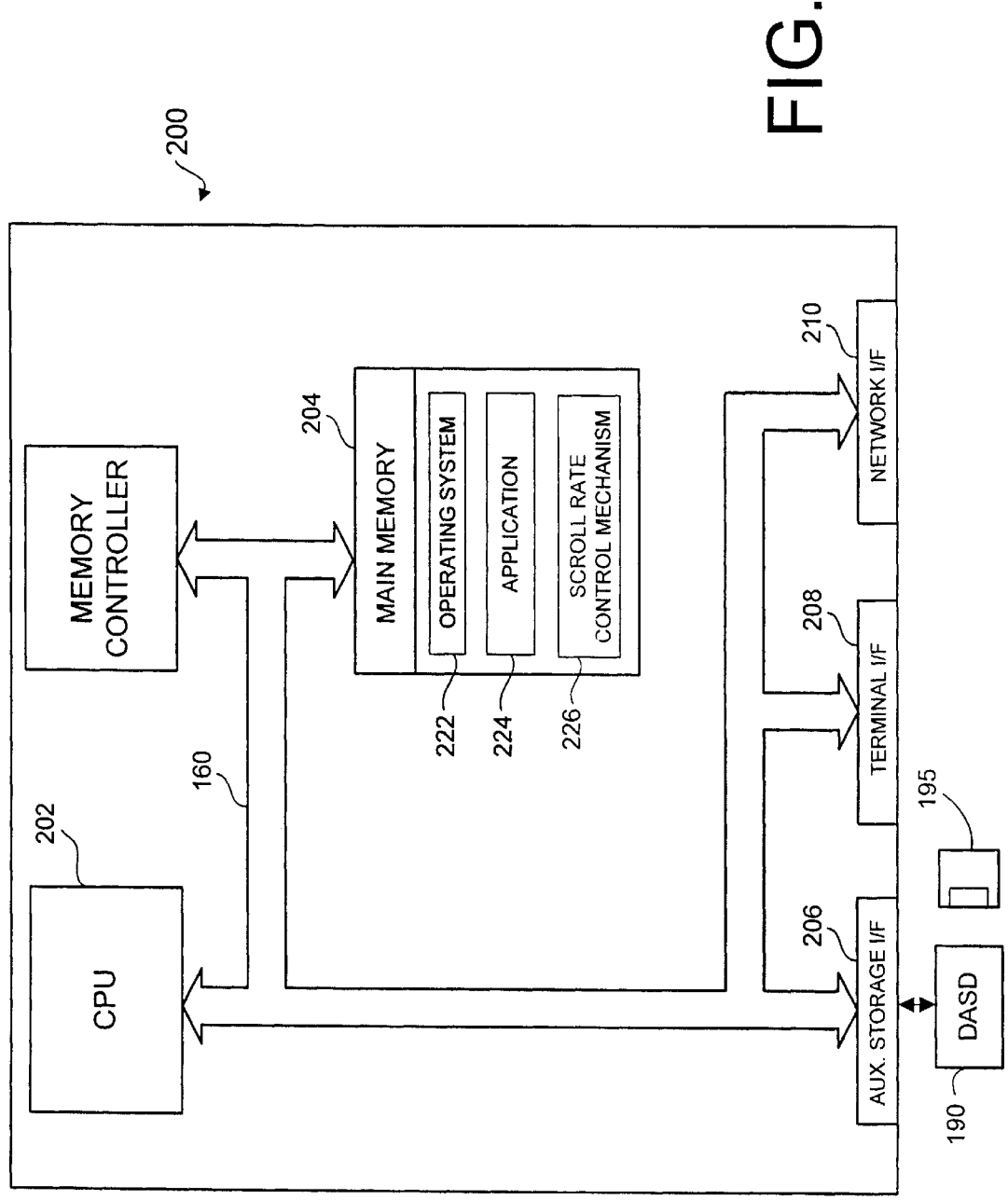
FIG. 1 is a block diagram view of a computer system in accordance with the preferred embodiment.

Referring now to FIG. 1. a block diagram of a computer system 200 is shown to illustrate a preferred embodiment of the present invention. The computer system 200 can be any suitable system, such as an IBM compatible personal computer, a Unix workstation, or a network computer. However, those skilled in the art will appreciate that the mechanisms and apparatus of the present invention apply equally to any computer system, regardless of whether the computer system is a complicated multi-user computing apparatus or a single user personal computer. As shown in the block diagram of FIG. 1, computer system 200 comprises main or central processing unit (CPU) 202 connected to main memory 204, auxiliary storage interface 206, terminal interface 208, and network interface 210. These system components are interconnected through the use of a system bus 160. Auxiliary storage interface 206 is used to connect mass storage devices (such as DASD devices 190 which stores data on a disk 195) to computer system 200.

Main memory 204 contains an operating system 222 and an application 224. In accordance with the preferred embodiment the main memory will also include a scroll rate control mechanism 226. The scroll rate control mechanism 226 is used to control the slider sensitivity such that large documents can be controllably viewed. Computer system 200 preferably utilizes well known virtual addressing mechanisms that allow the programs of computer system 200 to behave as if they only have access to a large, single storage entity instead of access to multiple, smaller storage entities such as main memory 204 and DASD devices. Therefore, while operating system 222, application 224 and scroll rate control mechanism 226 are shown to reside in main memory 204, those skilled in the art will recognize that these programs are not necessarily all completely contained in main memory 204 at the same time. It should also be noted that the term "memory" is used herein to generically refer to the entire virtual memory of computer system 200.

Although computer system 200 is shown to contain only a single main CPU and a single system bus, those skilled in the art will appreciate that the present invention may be practiced using a computer system that has multiple CPUs and/or multiple buses.

Terminal interface 208 is used to directly connect one or more terminals to computer system 200. These terminals may be non-intelligent or fully programmable workstations, and are used to allow system administrators and users to communicate with computer system 200.

Network interface 210 is used to connect other computer systems and/or workstations to computer system 200 in networked fashion. For example, the network interface can include a connection to the Internet and the World-Wide-Web or internal web-based systems (typically called intranets). The present invention applies equally no matter how computer system 200 may be connected to other computer systems and/or workstations, regardless of whether the connection is made using present-day analog and/or digital techniques or via some networking mechanism of the future.

Operating system 222 can be any operating system, such as OS/2, Windows, AIX, OS/400 etc, but is preferably an operating system that provides a graphical user interface, and those skilled in the art will appreciate that the spirit and scope of the present invention is not limited to any one operating system.

Application program 224 can be any type of application program which provides a view to any type of document. Thus, the application could comprise a word processing program, a spreadsheet program, a graphics program to provide several examples of a applications programs. It should also be noted that the term "document," when used in this specification can include any type of computer displayed data, such as text, graphics, tables, audio, multimedia or any combination thereof.

Scroll rate control mechanism 226 provides a scroll bar that maintains a useable slider regardless of the document size. The scroll rate control mechanism 226 can be implemented as part of the application 224, but is preferably implemented as part of operating system 222 and thus can provide improved user interface functionality for any application that runs on operating system 222. The scroll rate control mechanism 226 divides large documents into a plurality of domains, with a domain comprising a portion of the document with a size that can be efficiently manipulated using the scroll bar. In particular, the scroll rate control mechanism 226 provides a user interface with a viewing window and a scroll bar that provides access with to one domain of the document at a time. Other domains in the document are accessible by activating (i.e., clicking with a pointing device) a domain mark. Activiating on the domain mark moves the document view to that domain and the scroll bar then facilitates moving withing that domain. Thus, the present invention provides a graphical user interface to a large document while maintaining an effective scroll rate.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, CD-ROMs and transmission type media such as digital and analog communication links.

Figure 2:
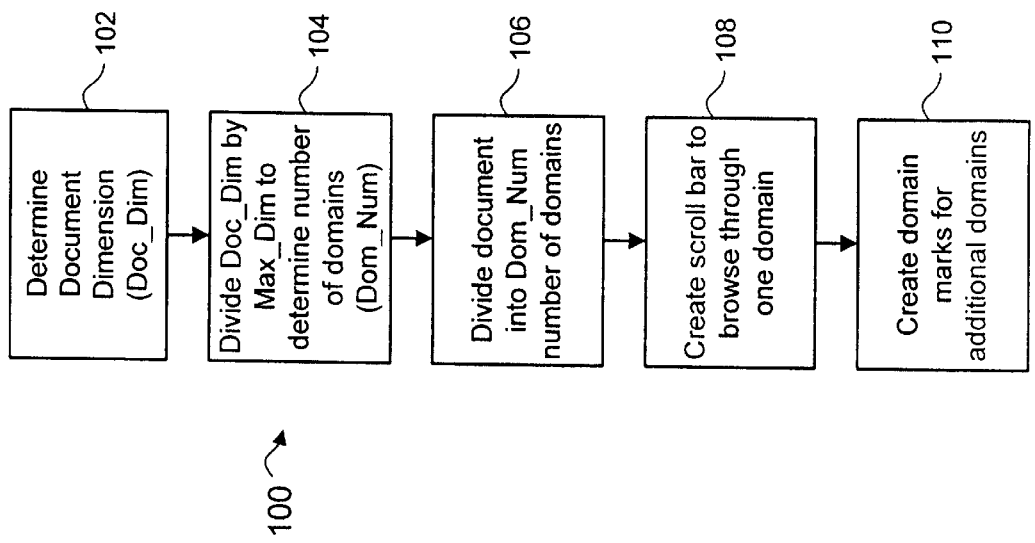
FIG. 2 is a flow diagram representing a scroll rate control mechanism in accordance with the preferred embodiment.

Turning now to FIG. 2, method 100 for providing scroll rate control in a graphical user interface is illustrated. The method 100 when implemented by an operating system or application provides for the viewing of large documents while maintaining an effective scroll rate. It should be noted that there are several ways a document can be "large" such that the scroll rate control mechanism must be used to provide an effective user interface to the document. For example, a document can be very "long" in the vertical direction such that the preferred embodiment provides an improved scroll bar for vertical movement within in the document. Additionally, a document can be very "wide" in the horizontal direction such that the preferred embodiment provides an improved scroll bar for horizontal movement in the document. Thus, the first step 102 is to determine the dimensions of the document, as represented by the variable Doc_Dim. Preferably, both the horizontal and vertical document dimensions are determined.

The next step 104 is to divide the document dimension by the maximum dimension (Max_Dim), resulting in the number of document domains for this document. The maximum dimension is the amount of document that can be browsed through using the scroll bar without requiring an excessive scroll rate. The maximum dimension could be dynamically determined by the system using a number of factors or set by a user according to his preference. For example, the maximum dimension could be dependent upon the computer systems monitor size and the number of pixels displayed by the monitor. As another example, a user could be provided with the ability to set the maximum dimension through the use of a preference setting in the application or a control utility in the operating system. As another example, a user could be provided with the ability to set the maximum slider sensitivity that is acceptable, and the system could automatically determine the maximum dimension that would allowable.

Dividing the document dimension by the maximum dimension determines the number of domains which must be used to provide an interface to the document without excessive slider sensitivity. In particular, taking the quotient and rounding up to the next integer provides the preferred number of domains to be used. Thus, if a document has a dimension of 300, and a maximum dimension of 125, the quotient is 2.4 and it will take 3 domains to provide an interface to the document without excessive slider sensitivity.

The next step 106 is to divide the document into the number of needed domains. Preferably, each domain comprises a substantially equal portion of the document. This will insure that the scroll rate will remain substantially the same for each domain. Of course, other ways of dividing the document could be used but preferably one is selected such that none of the domains has a dimension that exceeds the Max_Dim.

The next step 108 is to create a scroll bar mechanism. The scroll bar mechanism includes a scroll bar with a slider used to browse through the current document domain. The next step 110 is then to create a domain mark for each of the remaining non-current domains in the document that are not available through the slider. The scroll bar when combined with the domain marks provides an interface that can be used to effectively browse through large documents without excessive slider sensitivity that results in "jumpy" scroll bar behavior.

Figure 3:
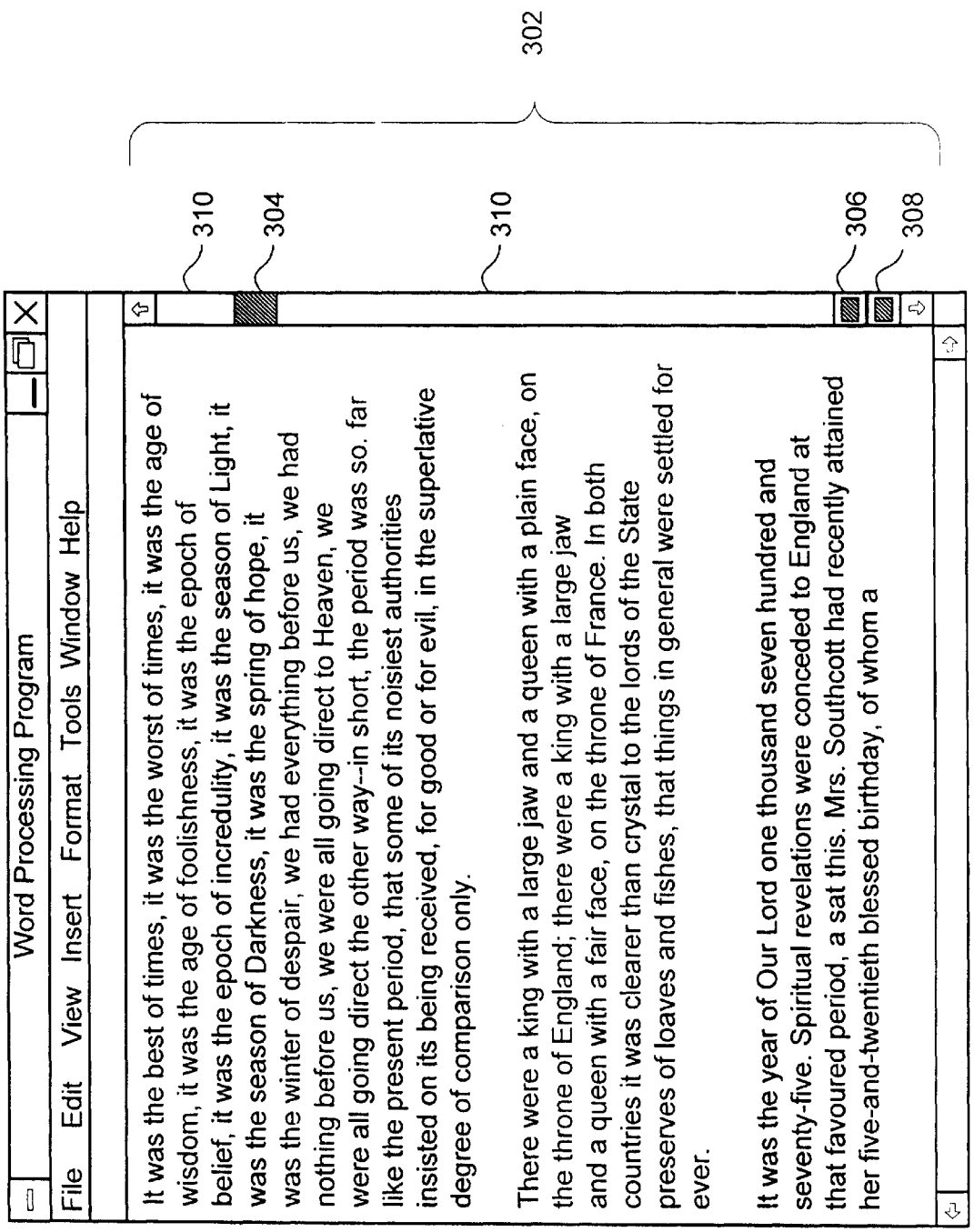
FIGS. 3–7 is a representation of a graphical interface incorporating a scroll rate control mechanism in accordance with the preferred embodiment.

Turning to FIG. 3 an exemplary user interface 300 is shown that incorporates a scroll rate control mechanism in accordance with the preferred embodiment. In the illustrated example the displayed document comprises three domains. The scroll rate control mechanism includes a scrolling mechanism 302 with a slider 304 that moves in scroll bar area 310. The slider 304 and scrolling mechanism 302 move the current domain through the viewing window. In addition, the scroll rate control mechanism includes a domain mark 306 and a domain mark 308. The first domain comprising the portion of the document that is currently being displayed and is viewable by scrolling the slider 304 in the scroll bar area 310. The second and third domains can be viewed by clicking the domain mark 306 and domain mark 308 respectively.

Figure 4:
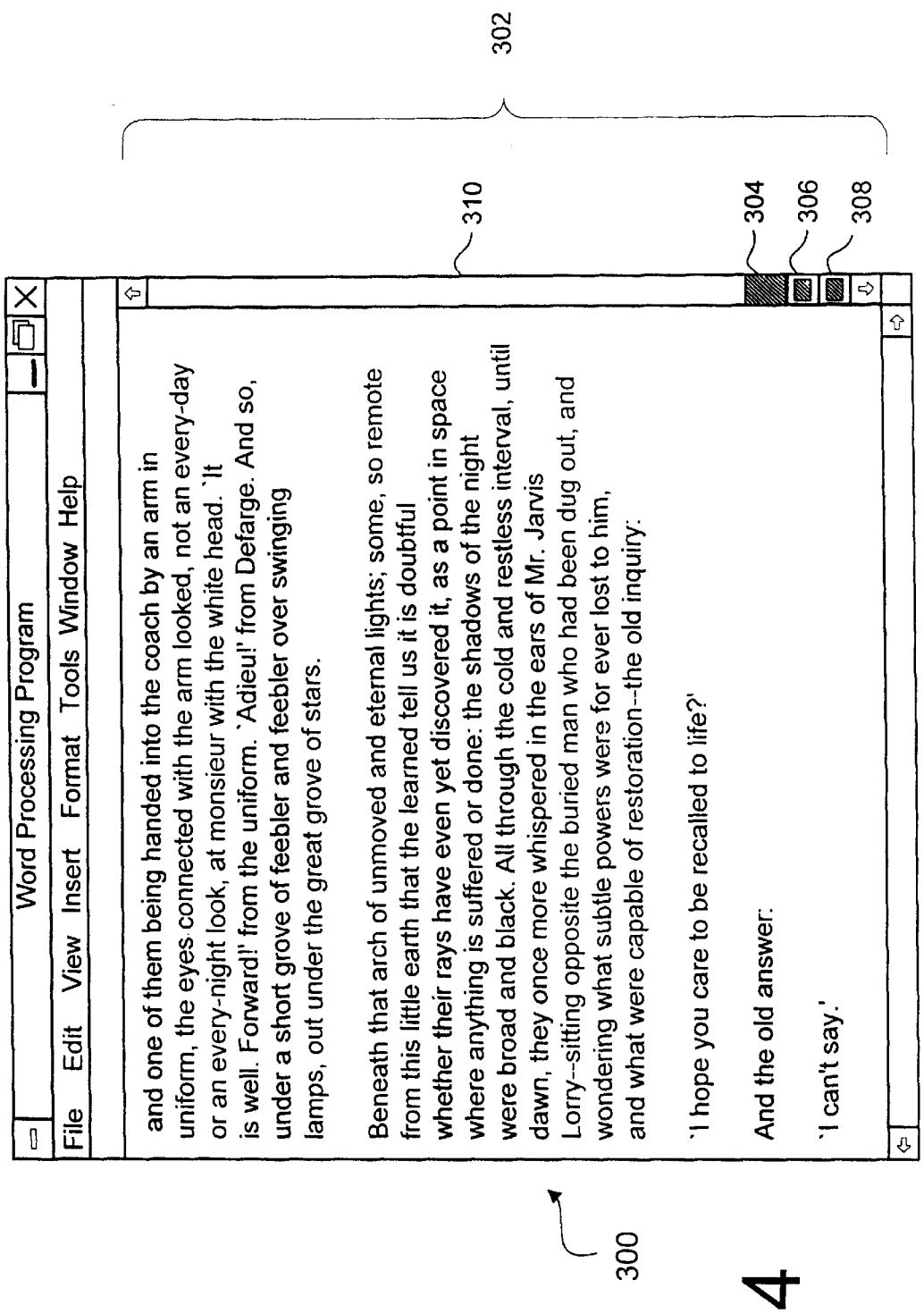

Turning to FIG. 4, the user interface 300 is shown with the slider 304 slid down to the end of the first domain. A this point there are two ways in the preferred embodiment for the user to get to the second domain. First, the user can click the first domain 306. The second is for the user to scroll down the document using a mechanism other than the slider 304 (e.g., the page-down key). When the displayed area of the document gets to the second domain the domain mark 306 representing that domain disappears and a domain mark 502 is created that represents the previous domain.

Figure 5:
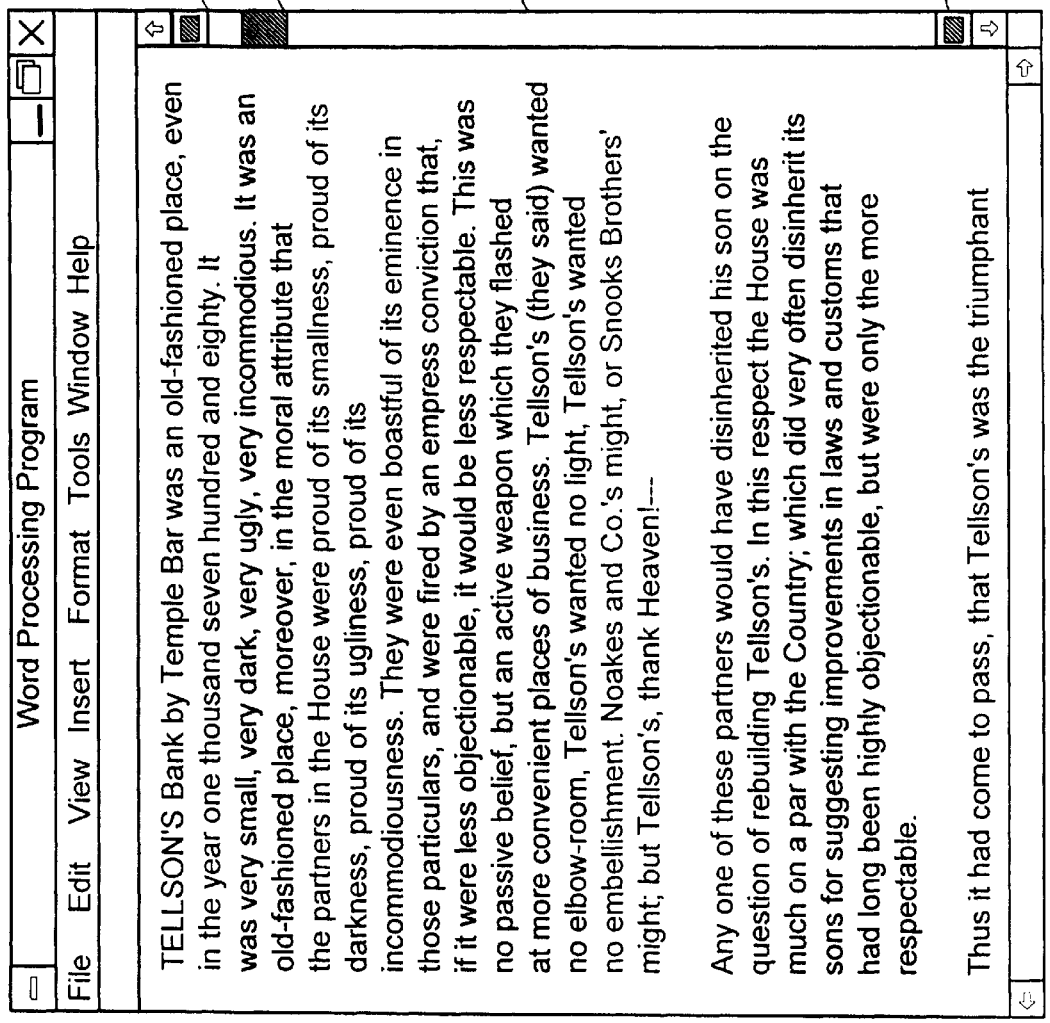

This results in the user interface 300 being as illustrated in FIG. 5, with the slider 304 returned to the top of the scroll bar area 310 and new domain mark 502 at the top of the scrolling mechanism 302. A user can return to the end of the previous domain by clicking on domain mark 502 or by scrolling up use a mechanism other than the slider 304.

Figure 6:
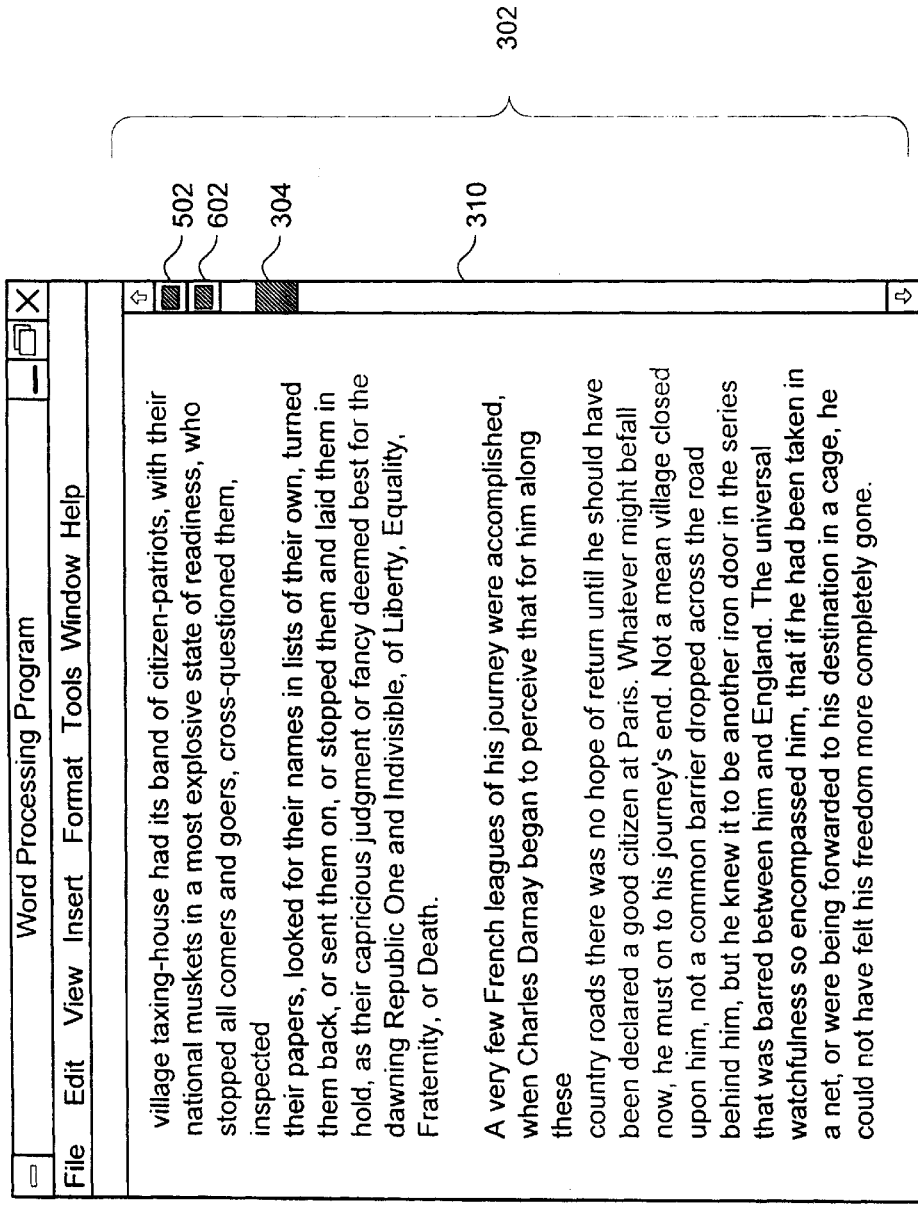

This process can be continued to the third domain. Turning to FIG. 6, the user interface 300 is illustrated with the third domain displayed in the viewing window and a new domain mark 602 created to represent the second domain.

Thus, the preferred embodiment provides an interface for viewing large documents that provides improved slider control without excessive slider sensitivity. The preferred embodiment can be used for documents that are large in the vertical direction, or for documents that are large in the horizontal direction, or a combination of both. In the case of a large horizontal document, domain marks would be added to the horizontal slider 610.

In the preferred embodiment, the division of a document into domains and the creation of domain marks would be dynamic. If more data is added to the document such that a new domain is necessary, the system will automatically create the domain and the domain mark.

There are several variations that are in accordance with the preferred embodiments. For example, some very large documents could result in a very large number of domain marks being required, and thus an excessive amount screen space being used by domain marks. In these cases "nested" domain marks could be used. A nested domain mark would preferably comprise a plurality of super-domain marks each containing a plurality of sub-domain marks. Thus only the non-current super-domain marks and the sub-domain marks for the current super-domain would be displayed at a time. When a user clicks on a super domain mark that mark would be expanded to show the sub-domains in that super-domain except for the current sub-domain. By only showing the sub-domain marks for one super-domain mark at a time, screen space is conserved while still allowing efficient access to the whole document.

Figure 7:
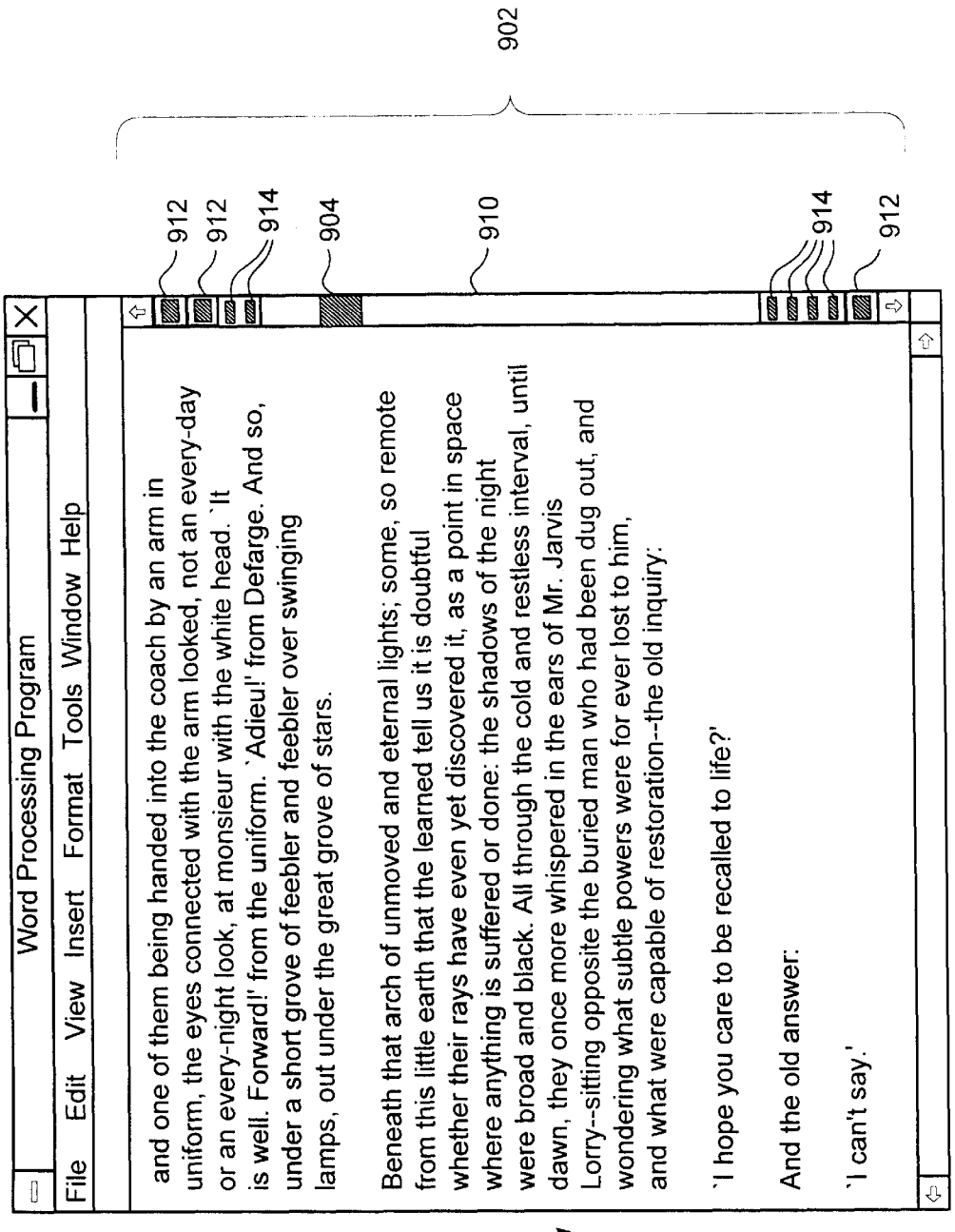
Figure 8:
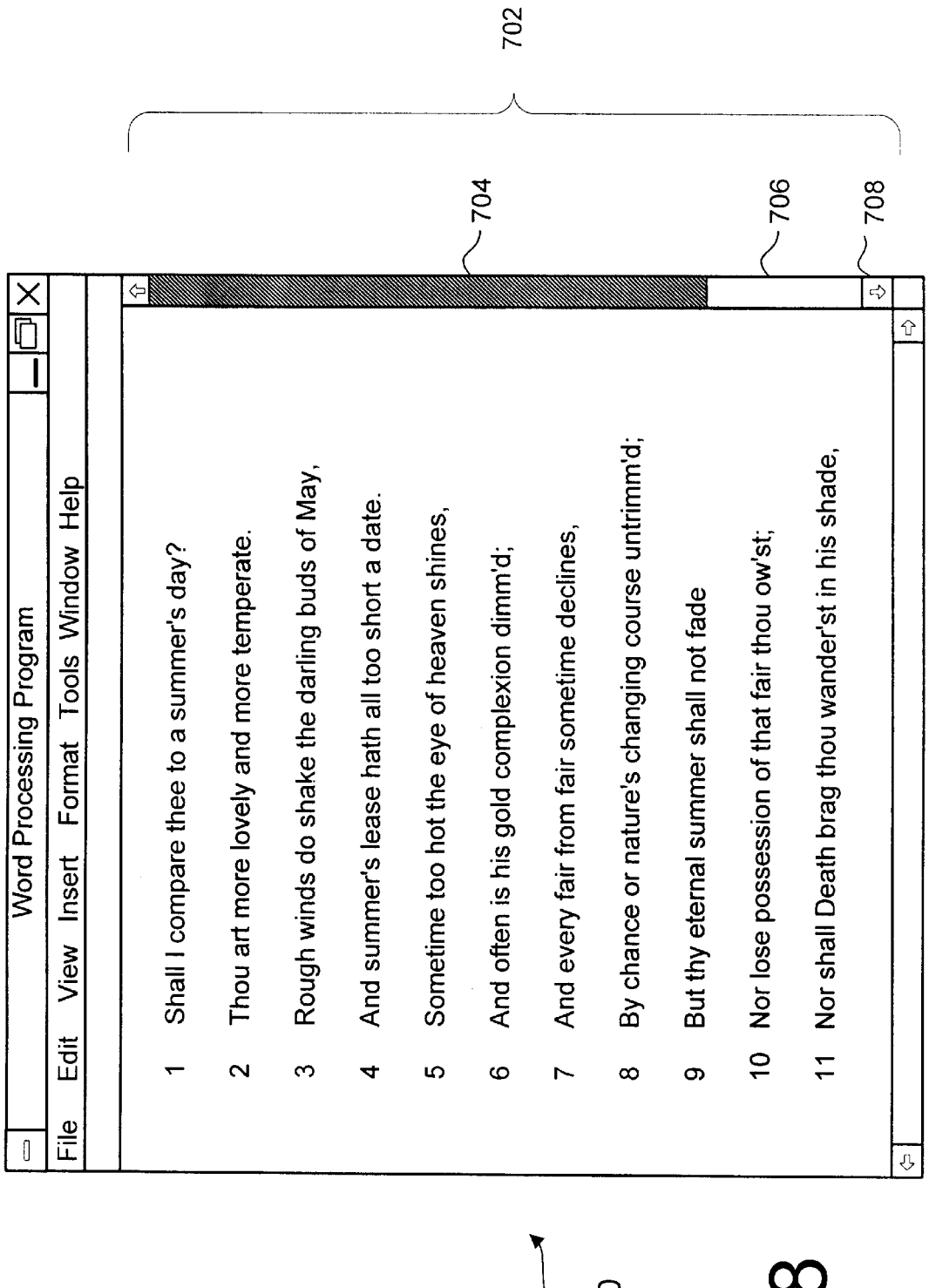
FIGS. 8–9 is a representation of a prior art graphical interface.
Figure 9:
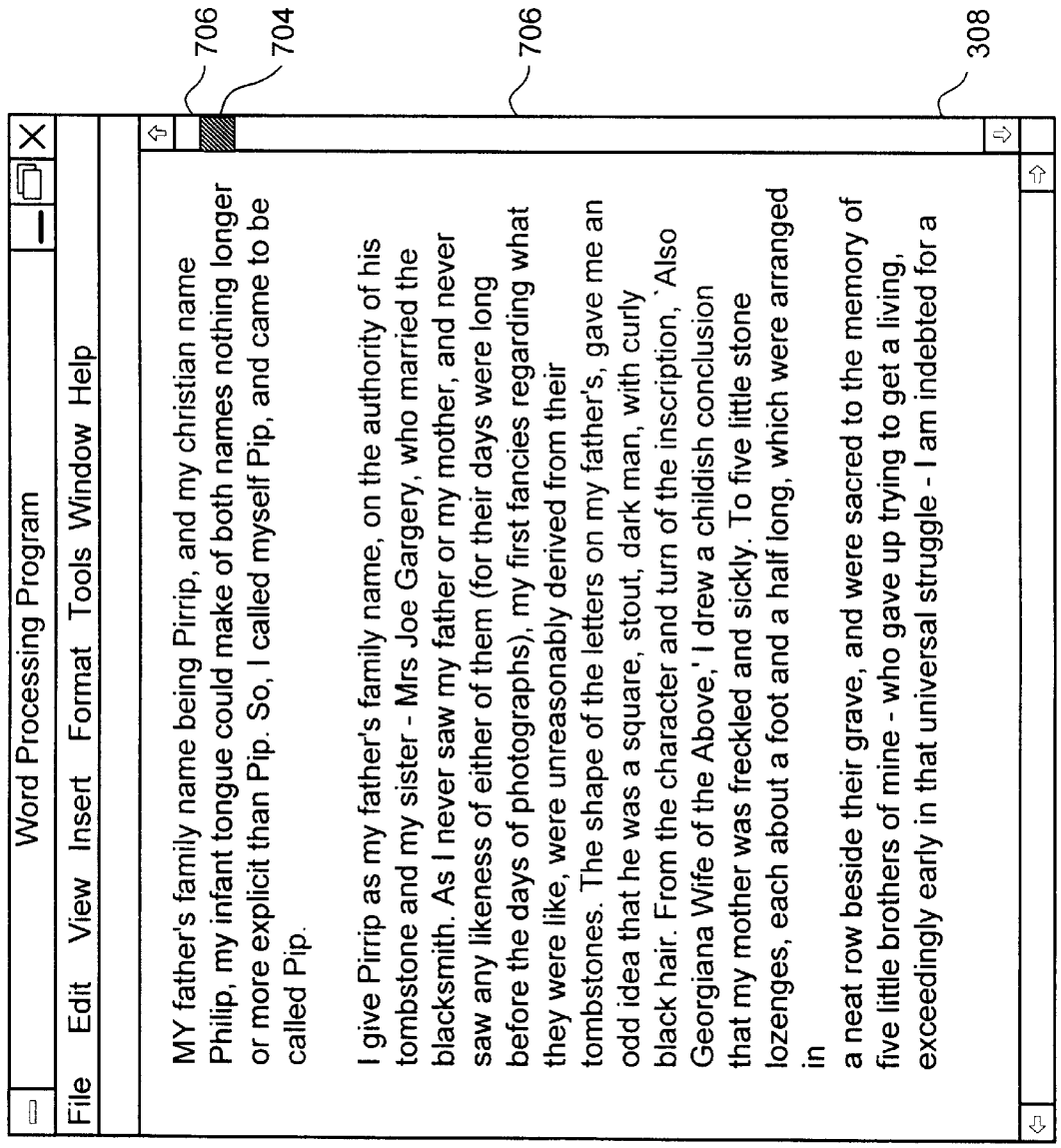

Turning to FIG. 7, a user interface 900 is illustrated that incorporates nested domain marks to allow for browsing through a very large document without excessive slider sensitivity. The interface 900 includes a scrolling mechanism 902 having a slider 904 which moves within a scroll bar area 910. Moving the slider 904 causes the document to move within the viewing window. The interface 900 includes a plurality of super-domain marks 912 which illustrate the non-current super-domains in the document. The interface 900 also includes a plurality of sub-domain marks 914 which represent the non-current sub-domains in the current super domain. Thus, a user can move to one of these sub-domains by clicking on a sub-domain mark 914. Alternatively, a user can move to a sub-domain in another super-domain by clicking on a super domain mark 912, which causes its sub-domain marks to appear.

The use of nested domains is preferably set by a defining a maximum number of domains that can be represented in a non-hierarchical way and automatically creating a nested domain system if the number of domains exceeds that amount.

The preferred embodiment of the present invention thus provides a method and apparatus for controlling the scroll rate of a scroll bar slider in a graphical user interface. The preferred embodiment uses a domain mechanism that divides large documents into multiple domains. The document is displayed in a viewing window with the slider moving the document from one of the current domain to the other end. The document can be moved within the viewing window to other domains by activating one of a plurality of domain marks, where each domain mark represents a domain not currently scrollable with the slider. Thus, the entire document can be easily browsed while the scroll rate is maintained at an effective level.

While the invention has been particularly shown and described with reference to an exemplary embodiment in a windowing graphical user interface, those skilled in the art will recognize that the preferred embodiments can be applied to various other types of user interfaces, and that various changes in form and details may be made therein without departing from the spirit and scope of the invention.

I claim:

1. An apparatus comprising:

at least one processor;

a memory coupled to the at least one processor;

a program residing in the memory, said program providing an interface for viewing a document comprising a scroll bar mechanism and a plurality of domain marks, wherein said interface divides said document into a plurality of domains, and wherein a selected one of said plurality of domains is viewable with said scroll bar mechanism, and wherein said scroll bar mechanism is switched to view other of said plurality of domains using said domain marks.

2. The apparatus of claim 1 wherein said scroll bar mechanism includes a slider which slides in a scroll bar area, and wherein said interface displays a top of said selected domain when said slider is at the top of said scroll bar area and wherein said interface displays a bottom of said selected domain when said slider is at the bottom of said scroll bar area.

3. The apparatus of claim 1 wherein said interface divides said document such that each of said plurality of domains has a dimension less than a defined maximum dimension.

4. The apparatus of claim 3 wherein said maximum dimension is defined to assure that said scroll bar mechanism has a slider sensitivity less than a defined maximum slider sensitivity.

5. The apparatus of claim 4 wherein said maximum slider sensitivity is determinable by a user of said program.

6. The apparatus of claim 4 wherein said maximum dimension is determinable by a user of said program.

7. The apparatus of claim 4 wherein said scroll bar mechanism automatically creates additional domains when additional dimension is added to said document such that a domain exceeds said maximum dimension.

8. The apparatus of claim 1 wherein said plurality of domain marks includes a plurality of super domain marks, each super domain mark having a corresponding plurality of sub-domain marks.

9. The apparatus of claim 8 wherein said activating a super-domain mark causes the corresponding sub-domain marks to be displayed.

10. The apparatus of claim 8 wherein each of said sub-domain marks corresponds to a portion of said document having a dimension less than a defined maximum dimension.

11. A method for displaying a document on a computer system, the method comprising the steps of:

a) dividing said document in to a plurality of domains, each of said domains having a dimension less than a defined maximum dimension;

b) displaying a first document domain of said document in a viewing window having a scroll-bar for navigating in said first document domain; and c) forming a plurality of domain marks corresponding to said plurality of domains other than said first domain.

12. The method of claim 11 further comprising the step of activating one of said plurality of domain marks such that said viewing window displays another of said plurality of domains.

13. The method of claim 12 further comprising the step of forming a new domain mark corresponding to said first document domain.

14. The method of claim 11 wherein said plurality of domains comprises a plurality of super-domains, each of said super-domains including a plurality of sub-domains, and wherein said plurality of domain marks correspond to said plurality of super-domains.

15. The method of claim 11 further comprising the step of forming a new domain and a corresponding new domain mark when data is added to said document such that at least one of said plurality of domains has a dimension which exceeds said maximum dimension.

16. The method of claim 11 further comprising the step of a user defining said maximum dimension.

17. The method of claim 11 further comprising the steps of a user defining a maximum slider sensitivity and further comprising the step of determining said maximum dimension based upon said maximum slider sensitivity.

18. A program product comprising:

(A) a program, said program providing an interface for viewing a document comprising a scroll bar mechanism and a plurality of domain marks, wherein said interface divides said document into a plurality of domains, and wherein a selected one of said plurality of domains is viewable with said scroll bar mechanism, and wherein said scroll bar mechanism is switched to view other of said plurality of domains using said domain marks; and (B) signal bearing media bearing said program.

19. The program product of claim 18 wherein said scroll bar mechanism includes a slider which slides in a scroll bar area, and wherein said interface displays a top of said selected domain when said slider is at the top of said scroll bar area and wherein said interface displays a bottom of said selected domain when said slider is at the bottom of said scroll bar area.

20. The program product of claim 18 wherein said signal bearing media comprises recordable media.

21. The program product of claim 18 wherein said signal bearing media comprises transmission media.

22. The program product of claim 18 wherein said interface divides said document such that each of said plurality of domains a dimension less than a defined maximum dimension.

23. The program product of claim 18 wherein said plurality of domain marks includes a plurality of super domain marks, each super domain marks having a corresponding plurality of sub-domain marks.

24. An apparatus comprising:

a) at least one processor;

b) a memory coupled to the at least one processor; and c) a computer program residing in the memory, said computer program providing an interface for viewing a large document, said interface including:

i) a dividing mechanism, said dividing mechanism dividing said large document into a plurality of domains such that each of said plurality of domains has a dimension less than a defined maximum dimension;

ii) a viewing window displaying a portion of said large document iii) a scroll bar mechanism, said scroll bar mechanism including a slider for moving within one of said plurality of domains in said large document;

iv) a plurality of domain marks, said plurality of domain marks moving said document in said viewing window to a corresponding domain when said domain mark is activated.

25. A method for displaying a document on a computer system, the method comprising the steps of:

a) determining a dimension of said document;

b) dividing said dimension by a defined maximum dimension, said division determining a domain number;

c) dividing said document in to a number of domains equal to said domain number, each of said domains having a dimension less than a defined maximum dimension;

d) forming a scroll bar mechanism for displaying a first of said number of domains in a viewing window, said scroll bar mechanism providing a means for navigating in said first of said number of domains; and e) forming a plurality of domain marks corresponding to said plurality of domains other than said first domain.

* * * * *